(12) United States Patent
O'Neal et al.

(10) Patent No.: US 7,764,188 B2
(45) Date of Patent: Jul. 27, 2010

(54) SYSTEM AND METHOD FOR MAINTAINING MACHINE OPERATION

(75) Inventors: Steven Wayne O'Neal, Bartonville, IL (US); Trent Ray Meiss, Eureka, IL (US)

(73) Assignee: Caterpillar Inc, Peoria, IL (US)

( * ) Notice: Subject to any disclaimer, the term of this patent is extended or adjusted under 35 U.S.C. 154(b) by 273 days.

(21) Appl. No.: 11/998,338

(22) Filed: Nov. 29, 2007

(65) Prior Publication Data

US 2009/0140872 A1     Jun. 4, 2009

(51) Int. Cl.
*G08B 21/00*     (2006.01)
(52) U.S. Cl. .................. 340/679; 340/517; 701/35; 701/63; 714/25; 714/2
(58) Field of Classification Search ........... 340/679, 340/514, 517, 686.1, 425.5, 438; 714/25, 714/2; 361/88, 93.1; 701/34, 63
See application file for complete search history.

(56) References Cited

U.S. PATENT DOCUMENTS

| | | | |
|---|---|---|---|
| 6,253,136 | B1 | 6/2001 | Stratton et al. |
| 6,598,195 | B1 | 7/2003 | Adibhatla et al. |
| 7,093,536 | B1 | 8/2006 | Archer et al. |
| 7,133,767 | B2 * | 11/2006 | Ogino et al. ............ 701/200 |
| 2004/0124971 | A1 | 7/2004 | MacTavish et al. |
| 2004/0259533 | A1 | 12/2004 | Nixon et al. |
| 2006/0025913 | A1 * | 2/2006 | Horikawa et al. .......... 701/45 |
| 2006/0259231 | A1 | 11/2006 | Ichikawa et al. |
| 2007/0053307 | A1 | 3/2007 | Greene et al. |
| 2007/0142989 | A1 | 6/2007 | Koehrsen et al. |
| 2007/0179730 | A1 | 8/2007 | Bornhoevd et al. |
| 2008/0189009 | A1 * | 8/2008 | Wang et al. ................ 701/34 |

FOREIGN PATENT DOCUMENTS

| | | |
|---|---|---|
| DE | 102006043317 | 3/2008 |
| JP | 07172132 A | 7/1995 |
| WO | 2007064410 | 6/2007 |
| WO | 2008095149 | 8/2008 |

* cited by examiner

*Primary Examiner*—George A Bugg
*Assistant Examiner*—Hongmin Fan
(74) *Attorney, Agent, or Firm*—Finnegan, Henderson, Farabow, Garrett & Dunner (57) ABSTRACT

A system for maintaining machine operation comprises at least one monitoring device coupled to a portion of a machine operating in a machine environment, the at least one monitoring device configured to monitor a parameter associated with the machine. The system also comprises a first electronic control module communicatively coupled to the at least one monitoring device. The electronic control module is configured to identify a data collection error associated with the at least one monitoring device. The electronic control module is also configured to detect, in response to the data collection error, a second electronic control module proximate the first electronic control module, the second electronic control module configured to collect at least one parameter that is interchangeable with the parameter. The electronic control module is further configured to establish a wireless communication channel with the second electronic control module and download the at least one parameter from the second control module via the wireless communication channel.

21 Claims, 4 Drawing Sheets

SYSTEM AND METHOD FOR MAINTAINING MACHINE OPERATION

TECHNICAL FIELD

The present disclosure relates generally to condition monitoring and telemetry systems for on-highway and off-highway machines and, more particularly, to systems and methods for maintaining machine operation despite a data collection error.

BACKGROUND

Many modern on-highway and off-highway machines such as, for example, automobiles, industrial engine systems, construction machinery, mining equipment, and other types of machines, are equipped with a sophisticated network of on-board data collection equipment. This data collection equipment is typically configured to monitor operating parameters of a machine, analyze the operating parameters based on threshold specifications indicative of "normal" machine operation, and identify a fault condition if the operating parameters are inconsistent with the threshold specifications. Certain "critical" fault conditions, if allowed to persist, may cause severe damage to the machine, which, in some cases, may lead to temporary or permanent failure of the machine.

In order to limit damage caused by the persistence of such critical fault conditions, some data collection systems are configured to prevent the machine from operating upon detection of one or more critical fault condition. In some cases, machine operation may only be re-initiated upon resetting of the fault condition by an authorized service technician, thereby ensuring that the critical fault condition was properly resolved before allowing further operation of the machine.

Although preventing machine operation in the presence of such critical fault conditions may limit damage to the machine by disabling the machine while such conditions are present, it may also have significant drawbacks. For example, a faulty or un-calibrated sensor may produce erroneous data, which may cause improper detection of a fault condition. Such improper or erroneous fault detections may lead to unnecessary disabling of the machine, which may reduce machine and/or project environment productivity.

One solution to limit erroneous fault detection involves installing redundant data collection systems, whereby one data collection system serves as a backup to the other data collection system. In order to positively detect a critical fault condition, both data collection systems may be required to detect the fault condition. If a first data collection system indicates that the machine is operating normally, while a second data collection system detects a fault condition, the control module may identify the data collected by the second data collection system as being faulty or erroneous, and ignore such data.

Although redundant data collection solution may reduce the number of erroneous fault conditions detected by a data collection system and, therefore, limit the amount of unnecessary machine downtime due to erroneous fault detections, such solutions may be expensive. For example, redundant systems require the installation of back-up sensors and data collection equipment, which may significantly increase manufacturing and production costs when compared with single-sensor solutions. Thus, in order to increase the reliability of fault detection systems to reduce the number of erroneous machine shut-downs without unnecessarily increasing machine production and equipment costs, a system for temporarily resolving erroneous fault conditions and sensor failures may be required.

One method for resolving sensor failures is described in U.S. Pat. No. 7,093,536 ("the '536 patent) to Archer et al. The '536 patent describes a fault tolerant method for operating a cotton packaging machine. The method described in the '536 patent involves monitoring data collected by a plurality of position sensors of the machine and identifying, based on the collected data, a faulty or failed position sensor. Data collected from a healthy position sensor may be substituted for data that should have been collected by the faulty position sensor, thereby preventing shut-down of the machine that would have otherwise occurred as a result of the faulty sensor.

Although the system of the '536 patent may reduce machine downtime due to faulty sensors data in situations where a faulty machine sensor has an available on-board counterpart, it may still be inadequate. For example, the system of the '536 patent requires that a similar (e.g., backup) sensor be physically located on the machine. As a result, faults associated with sensors that may by not have a similar counterpart located on the machine (e.g., engine temperature sensor, oil pressure sensor, etc.) may still result in unnecessary shut-down of the machine. Furthermore, including an additional sensor solely as a backup for an existing sensor may significantly increase machine equipment costs.

The presently disclosed systems and methods for temporary resolution of fault conditions for machine controllers are directed toward overcoming one or more of the problems set forth above.

SUMMARY

In accordance with one aspect, the present disclosure is directed toward a system for maintaining machine operation. The system may comprise at least one monitoring device coupled to a portion of a machine operating in a machine environment, the at least one monitoring device configured to monitor a parameter associated with the machine. The system may also comprise a first electronic control module communicatively coupled to the at least one monitoring device. The electronic control module may be configured to identify a data collection error associated with the at least one monitoring device. The electronic control module may also be configured to detect, in response to the data collection error, a second electronic control module proximate the first electronic control module, the second electronic control module configured to collect at least one parameter that is interchangeable with the parameter. The electronic control module may be further configured to establish a wireless communication channel with the second electronic control module and download the at least one parameter from the second control module via the wireless communication channel.

According to another aspect, the present disclosure is directed toward a method for maintaining machine operation. The method may comprise identifying a data collection error associated with a parameter to be collected by a first electronic control module of a machine. In response to the data collection error, a second electronic control module proximate the first electronic control module may be detected, the second electronic control module configured to collect at least one parameter that is interchangeable with the parameter. The first electronic control module may establish a wireless communication channel between the first electronic control module and the second electronic control module. The method may also include querying the second electronic control module for the at least one parameter and receiving the at least one parameter from the second control module via the wireless communication channel, in response to the query.

In accordance with another aspect, the present disclosure is directed toward a project environment comprising a first machine operating in the project environment, the first machine being proximate a second machine. The project environment may also include at least one monitoring device coupled to a portion of the first machine, the at least one monitoring device configured to monitor a parameter associated with the first machine. The project environment may further include a first electronic control module disposed on the first machine and communicatively coupled to the at least one monitoring device. The first electronic control module may be configured to identify a data collection error associated with the at least one monitoring device. The first electronic control module may also be configured to detect, in response to the data collection error, a second electronic control module associated with the second machine, the second electronic control module configured to collect at least one parameter that is interchangeable with the parameter. The first electronic control module may also be configured to establish a wireless communication channel with the second electronic control module and download the at least one parameter from the second control module via the wireless communication channel.

DETAILED DESCRIPTION

Figure 1:
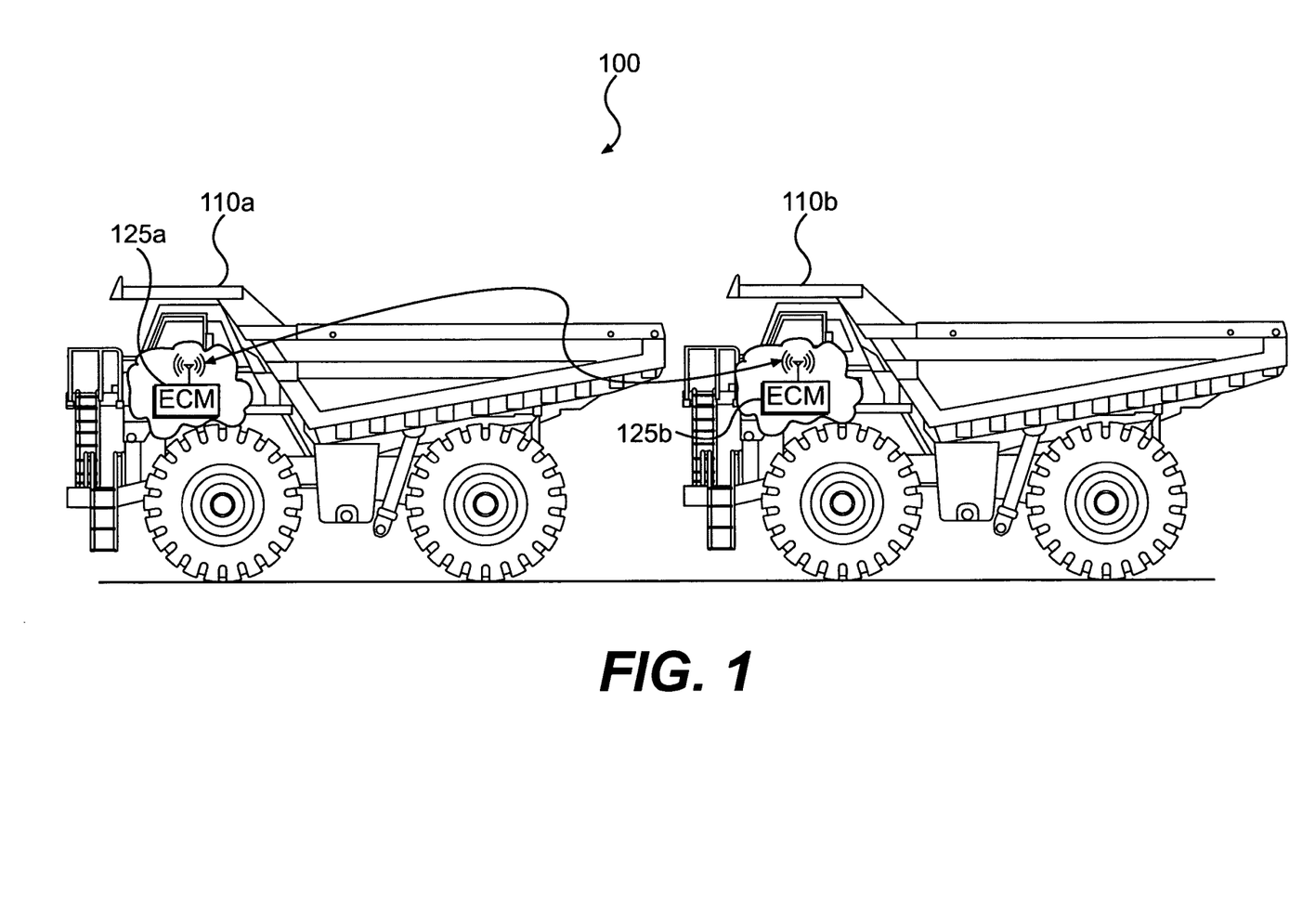
FIG. 1 illustrates an exemplary project environment consistent with the disclosed embodiments.

FIG. 1 illustrates an exemplary project environment 100 consistent with the disclosed embodiments. Project environment 100 may include one or more components that perform individual tasks that contribute to a machine environment task, such as mining, construction, transportation, agriculture, manufacturing, or any other type of task associated with other types of industries. For example, project environment 100 may include one or more machines 110a, 110b, each configured to perform a task associated with project environment 100.

Project environment 100 may be configured to monitor, collect, control, and/or filter information associated with an operation of one or more machines 110 and distribute the information to one or more back-end systems, such as an off-site monitoring and analysis facility. It is contemplated that additional and/or different components than those listed above may be included in project environment 100. For example, project environment 100 may include a back-end diagnostic system, in data communication with one or more machines 110a, 110b via a communication network. The back-end diagnostic system may be configured to collect and analyze data associated with the one or more machines 110a, 110b, and distribute the collected and/or analyzed data to one or more data subscribers. Data subscribers may include computer systems associated with a person or entity associated with project environment such as, for example, a machine owner, a project manager, a repair technician, or any other person or entity that may be associated with project environment 100 or one or more machines 110a, 100b associated therewith.

Machines 110a, 110b may each be a fixed or mobile machine configured to perform an operation associated with project environment 100. Thus, machine, as the term is used herein, refers to a fixed or mobile machine that performs some type of operation associated with a particular industry, such as mining, construction, farming, etc. and operates between or within project environments (e.g., construction site, mine site, power plants, etc.) Furthermore, machines 110a, 110b may embody any remote asset operating within or associated with project environment 100. A non-limiting example of a fixed machine includes an engine system operating in a plant, a material conveyer, or off-shore environment (e.g., off-shore drilling platform). Non-limiting examples of mobile machines include commercial machines, such as trucks, cranes, earth moving vehicles, mining vehicles, backhoes, material handling equipment, farming equipment, marine vessels, aircraft, and any type of movable machine that operates in a work environment. A machine may be driven by a combustion engine or an electric motor. The types of machines listed above are exemplary and not intended to be limiting. It is contemplated that project environment 100 may implement any type of machine. Accordingly, although FIG. 1 illustrates machines 110a, 110b as mobile haulage machines, machines 110a, 110b may each be any type of machine operable to perform a particular function within project environment 100.

Machines 110a, 110b may each include on-board data collection and communication equipment to monitor, collect, and/or distribute information associated with one or more components of the respective machine 110a, 110b. According to one embodiment, on-board data collection and communication equipment may include an electronic control module (ECM) 125a, 125b that, in addition to controlling operation of one or more machine systems or subsystems, may be configured to collect and distribute machine data. It is contemplated that machines 110a, 110b may include additional and/or different on-board data collection and communication equipment. For example, machines 110a, 110b may include data monitoring equipment (e.g., sensors, control modules, data collectors, etc.) coupled to the ECM for monitoring health, productivity, status, and/or performance associated with machines 110a, 110b. Furthermore, although on-board data collection and communication equipment associated with machines 110a, 110b are illustrated as electronic control modules 125a, 125b, such data collection and communication equipment may include or embody standalone data collection equipment, separate and independent from the machine controllers.

Each of ECMs 125a, 125b may be configured for direct data communication with one or more ECMs associated with other machines operating within project environment 100. For example, each of ECMs 125a, 125b may include any suitable type of short-range communication equipment such as, for example, peer-to-peer communication transceivers, personal area network communication transceivers (e.g., Bluetooth), direct point-to-point or point-to-multipoint communication devices, or any other suitable communication equipment adapted to facilitate communication directly between one or more ECMs 125a, 125b and/or between ECMs 125a, 125b and a back-end system via a wireless communication network. Communication and networking systems for facilitating communication between or among ECMs 125a, 125b of different machines and/or between ECMs 125a, 125b and a back-end system will be described in greater detail below, with respect to FIG. 2.

Figure 2:
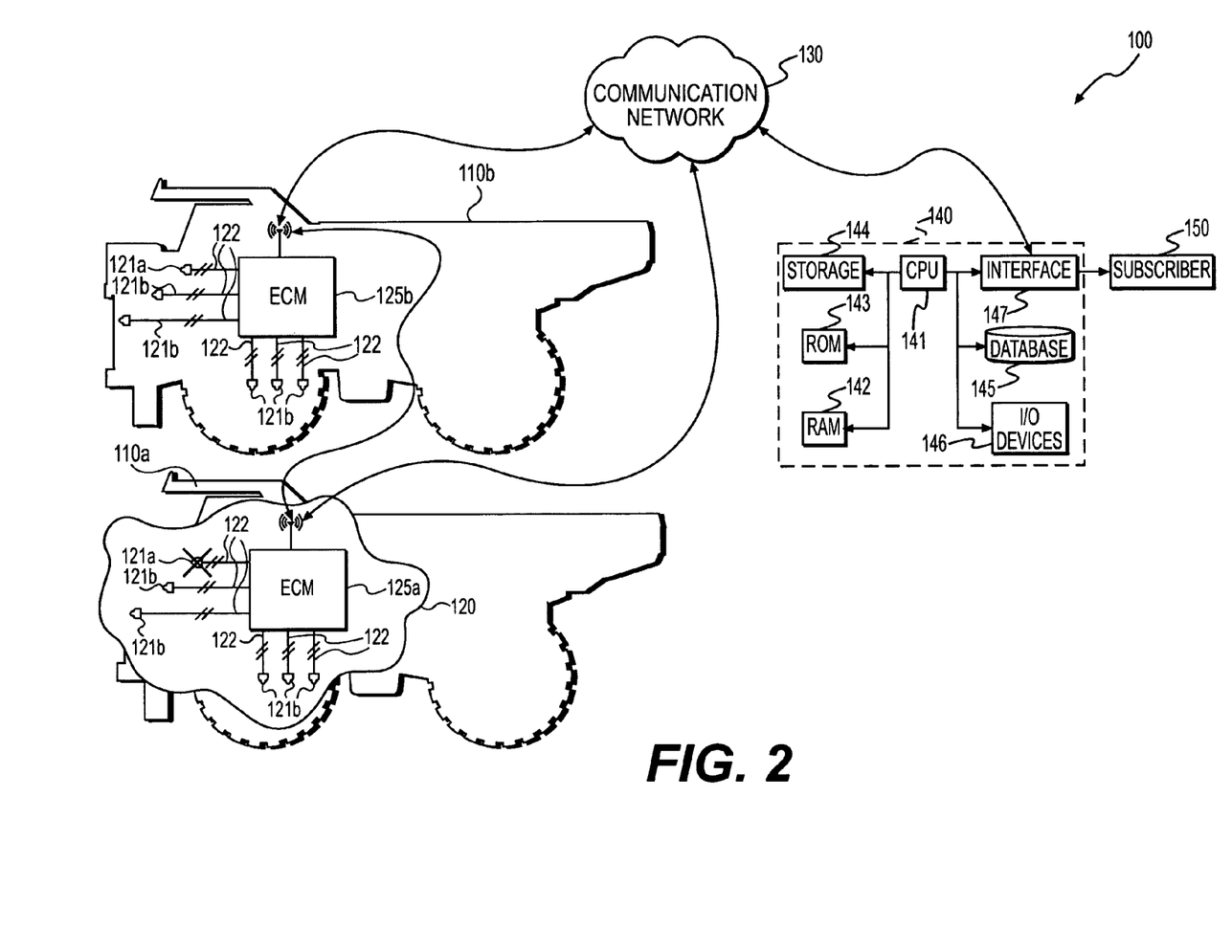
FIG. 2 provides a schematic illustrating certain exemplary components of the project environment of FIG. 1.

As illustrated in the schematic diagram of FIG. 2, project environment 100 may include a system 120 for temporarily resolving fault and failure conditions in machine controllers. The system may include a plurality of components and subsystems configured to collect machine data associated with a first machine 110a, identify a data collection error associated with a first electronic control module 125a of the first machine 110a, and collect data from a second electronic control module 125b of a second machine 110b to temporarily resolve the data collection error. Project environment 100 may also facilitate communication between machines 110a, 110b and a back-end system, such as a condition monitoring system 140, via a communication network 130. Condition monitoring system 140 may be configured to monitor, record, analyze, and/or distribute data associated with machines 110a, 110b to one or more data subscribers 150. Operation of project environment 100 and its constituent components and subsystems will now be described in more detail.

As shown in FIG. 2, machines 110a, 110b may each include, among other things, one or more monitoring devices 121a, 121b (e.g., sensors or other data collectors); one or more ECMs 125a, 125b coupled to monitoring devices 121a, 121b via communication lines 122; and/or any other component that may be used for monitoring, collecting, and communicating information associated with the operation of machines 110a, 110b. Machines 110a, 110b may also be configured to exchange information with off-board systems, such as a condition monitoring system 140, via a communication network 130. The components described above are exemplary and not intended to be limiting. Accordingly, the disclosed embodiments contemplate machines 110a, 110b including additional, fewer, and/or different components than those listed above.

Monitoring devices 121a, 121b may include any device for collecting operation data associated with machines 110a, 110b. For example, monitoring devices 121a, 121b may include one or more sensors for measuring an operational parameter such as engine and/or machine speed; machine location; fluid pressure, flow rate, temperature, contamination level, and or viscosity of a fluid; electric current and/or voltage levels; fluid (i.e., fuel, oil, etc.) consumption rates; loading levels (i.e., payload value, percent of maximum payload limit, payload history, payload distribution, etc.); transmission output ratio, slip, etc.; haul grade and traction data; drive axle torque; intervals between scheduled or performed maintenance and/or repair operations; and any other operational parameter of respective machines 110a, 110b.

ECMs 125a, 125b may each be configured to receive, collect, package, and/or distribute data collected by monitoring devices 121a, 121b of the respective machine. Operation data, as the term is used herein, refers to any type of data indicative of at least one operational aspect associated with a machine or any of its constituent components or subsystems. Non-limiting examples of operation data may include, for example, health information such as fuel level, oil pressure, engine temperate, coolant flow rate, coolant temperature, tire pressure, or any other data indicative of the health of one or more components or subsystems of the machine. Alternatively and/or additionally, operation data may include status information such as engine power status (e.g., engine running, idle, off), engine hours, engine speed, machine speed, location, or any other data indicative of a status of the machine. Optionally, operation data may also include certain productivity information such as, task progress information, load vs. capacity ratio, shift duration, haul statistics (weight, payload, etc.), fuel efficiency, or any other data indicative of a productivity of the machine. Alternatively and/or additionally, operation data may include control signals for controlling one or more aspects or components of a respective machine. ECMs 125a, 125b may receive/collect operational information associated with an operation of respective machine 110a, 110b from one or more monitoring devices 121a, 121b during the execution of an assigned task.

ECMs 125a, 125b may each be configured to detect fault conditions of the machine based on the received operation data. For example, ECMs 125a, 125b may compare individual operational parameters of the operation data with a corresponding threshold associated with each respective operational parameter. If the measured operational parameter is inconsistent with the threshold, the ECM associated with the inconsistent parameter may detect a fault condition and generate a signal indicative of the fault condition.

Those skilled in the art will recognize that inconsistency between measured operational parameters and their corresponding thresholds is a function of the particular parameter under investigation. For example, certain parameters may be compared with a threshold maximum value. Thus, inconsistency is detected when the measured operational parameter exceeds the threshold limit. In contrast, certain other parameters, such as engine temperature may be compared with a respective threshold range. Engine temperatures exceeding the upper limit of the range or falling below the lower limit of the range may be identified as inconsistent. Accordingly, data inconsistency, as the term is used herein, refers to a deviation between a measured operational parameter and a threshold value associated with the parameter that exceeds a predetermined acceptable level for the parameter.

ECMs 125a, 125b may each include one or more components for distributing the received operation data to one or more external devices, such as condition monitoring system 140. For example, ECMs 125a, 125b may each include wireless transceivers configured to distribute collected operation data to condition monitoring system 140 via communication network 130. According to one embodiment, ECMs 125a, 125b may include wireless LAN transceivers adapted to communicate with a wireless LAN access point that, in turn, may access the Internet or other public or private network to facilitate communications between condition monitoring system 140 and machines 110a, 110b. Alternatively or additionally, ECM 125 may include a satellite or cellular communication module (not shown) configured to distribute operation data via a subscriber-based satellite or cellular communication network.

ECMs 125a, 125b may also each be configured for direct communication with one or more other ECMs associated with project environment 100. For example, ECMs 125a, 125b may each include short-to-medium range communication equipment adapted for peer-to-peer (or ad-hoc), point-to-point, point-to-multipoint, personal area network (e.g. Bluetooth), and/or wireless LAN communication between multiple ECMs operating in project environment 100. According to one exemplary embodiment, ECMs 125a, 125b may each include IEEE 802.11-compliant transceivers adapted to communicate with a centralized distribution node (i.e., access point) and/or directly with other 802.11-compliant devices within project environment 100.

ECMs 125a, 125b may each be configured to detect a data collection error associated with one or more of monitoring devices 121a, 121b. Data collection error, as the term is used herein, refers to any error associated with one or more monitoring devices 121 that results in an error in the operation data or a failure to properly collect the operation data. Non-limiting examples of data collection errors include, for example, a communication failure between monitoring devices 121a, 121b and a respective ECM 125a, 125b, an abnormal deviation of the operation data from a previously detected trend, an error in the operation data due to a faulty or failed monitoring device 121, an abnormal deviation of the operation data from an average trend associated with a plurality of machines operating in the same environment, or any other type of fault resulting in unreliable or erroneous operation data.

For example, as illustrated in FIG. 2, first ECM 125a associated with first machine 110a may detect a failure associated with a first monitoring device 121a. Upon detection of the failure of first monitoring device 121a, first ECM 125a may establish a connection with a second ECM 125b associated with a second machine 125b. ECM 125a may request data associated with a second monitoring device 121a associated with second ECM 125b, wherein the second monitoring device 121a associated with second ECM 125b is compatible and interchangeable with first monitoring device 121a associated with first ECM 125a. In response to the request, second ECM 125b may transmit data collected by second monitoring device 121a to ECM 125a. ECM 125a may receive the data associated with second monitoring device 121a from second ECM 125b, and substitute the received data for the erroneous data associated with first monitoring device 121a associated with first ECM 125a.

Upon detection of a data communication error, ECMs 125a, 125b may be configured to identify one or more ECMs located on at least one other machine, establish a wireless communication channel with the at least one other machine, query the ECM(s) associated with the other machine(s) for a parameter compatible with the parameter corresponding to the data collection error, and substitute a compatible parameter from the other machine(s) with the erroneous parameter. Processes and methods associated with resolving data collection errors will be described in greater detail below with respect to FIG. 3.

Communication network 130 may include any network that provides two-way communication between machines 110a, 110b and an off-board system, such as condition monitoring system 140. For example, communication network 130 may communicatively couple machines 110a, 110b to condition monitoring system 140 across a wireless networking platform such as, for example, a satellite communication system. Alternatively and/or additionally, communication network 130 may include one or more broadband communication platforms appropriate for communicatively coupling one or more machines 110a, 110b to condition monitoring system 140 such as, for example, cellular, Bluetooth, microwave, point-to-point wireless, point-to-multipoint wireless, multipoint-to-multipoint wireless, or any other appropriate communication platform for networking a number of components. Although communication network 130 is illustrated as a wireless communication network, it is contemplated that communication network 130 may include wireline networks such as, for example, Ethernet, fiber optic, waveguide, or any other type of wired communication network.

Communication network 130 may also include any necessary infrastructure to support message routing and network operations. For example, communication network 130 may include various hardware and software support systems and equipment that facilitates operations of one or more communication services. Hardware and software support systems may include routers, switches, hubs, multiplexers, demultiplexers, high-capacity storage devices, and any software associated with one or more of these systems.

Condition monitoring system 140 may be configured to receive, store, analyze, and record operation data associated with machines 110a, 110b. According to one embodiment, condition monitoring system 140 may be configured to detect one or more ECMs 125a, 125b of machines 110a, 110b operating within project environment 100 and query each ECM for operation data associated with the respective machine. Condition monitoring system 140 may receive operation data from ECMs 125a, 125b in response to the query. Alternatively or additionally, condition monitoring system 140 may be configured to automatically receive operation data from each of ECMs 125a, 125b. For example, ECMs 125a, 125b may each be configured to automatically detect communication network 130 and transmit operation data to condition monitoring system 140 via communication network 130.

Condition monitoring system 140 may be any computing system configured to receive, transmit, analyze, and distribute operation data collected by machines 110a, 110b. According to one embodiment, condition monitoring system 140 may include any type of processor-based system on which processes and methods consistent with the disclosed embodiments may be implemented. As illustrated in FIG. 2, condition monitoring system 140 may include one or more hardware and/or software components configured to execute software programs, such as software for analyzing machine operation data and diagnosing problems associated with the machine, based on the analysis. For instance, condition monitoring system 140 may include one or more hardware components such as, for example, a central processing unit (CPU) 141 or suitable processor, a random access memory (RAM) module 142, a read-only memory (ROM) module 143, a storage system 144, a database 145, one or more input/output (I/O) devices 146, and an interface 147. Alternatively and/or additionally, condition monitoring system 140 may include one or more software components such as, for example, a computer-readable medium including computer-executable instructions for performing methods consistent with certain disclosed embodiments. It is contemplated that one or more of the hardware components listed above may be implemented using software. For example, storage 144 may include a software partition associated with one or more other hardware components of condition monitoring system 140. Condition monitoring system 140 may include additional, fewer, and/or different components than those listed above. It is understood that the components listed above are exemplary only and not intended to be limiting.

CPU 141 may include one or more processors, each configured to execute instructions and process data to perform one or more functions associated with condition monitoring system 140. As illustrated in FIG. 2, CPU 141 may be communicatively coupled to RAM 142, ROM 143, storage 144, database 145, I/O devices 146, and interface 147. CPU 141 may be configured to execute sequences of computer program instructions to perform various processes, which will be described in detail below. The computer program instructions may be loaded into RAM for execution by CPU 141.

RAM 142 and ROM 143 may each include one or more devices for storing information associated with an operation of condition monitoring system 140 and/or CPU 141. For example, ROM 143 may include a memory device configured to access and store information associated with condition monitoring system 140, including information for identifying, initializing, and monitoring the operation of one or more components and subsystems of condition monitoring system 140. RAM 142 may include a memory device for storing data associated with one or more operations of CPU 141. For example, ROM 143 may load instructions into RAM 142 for execution by CPU 141.

Storage 144 may include any type of mass storage device configured to store information that CPU 141 may need to perform processes consistent with the disclosed embodiments. For example, storage 144 may include one or more magnetic and/or optical disk devices, such as hard drives, CD-ROMs, DVD-ROMs, or any other type of mass media device.

Database 145 may include one or more software and/or hardware components that cooperate to store, organize, sort, filter, and/or arrange data used by condition monitoring system 140 and/or CPU 141. For example, database 145 may include historical data such as, historic operation, status, and/or productivity data associated with one or more machines operating in the project environment 100. Performance or operational trends may be recorded and analyzed to adjust one or more aspects of machine operation to enhance the operational efficiency and/or productivity of the machine. It is contemplated that database 145 may store additional and/or different information than that listed above.

I/O devices 146 may include one or more components configured to communicate information with a user associated with condition monitoring system 140. For example, I/O devices may include a console with an integrated keyboard and mouse to allow a user to input parameters associated with condition monitoring system 140. I/O devices 146 may also include a display including a graphical user interface (GUI) for outputting information on a monitor. I/O devices 146 may also include peripheral devices such as, for example, a printer for printing information associated with condition monitoring system 140, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 147 may include one or more components configured to transmit and receive data via a communication network, such as the Internet, a local area network, a workstation peer-to-peer network, a direct link network, a wireless network, or any other suitable communication platform. For example, interface 147 may include one or more modulators, demodulators, multiplexers, demultiplexers, network communication devices, wireless devices, antennas, modems, and any other type of device configured to enable data communication via a communication network.

Condition monitoring system 140 may include one or more software applications for diagnosing problems associated with machine 110 and notifying one or more subscribers 150 (e.g., repair personnel, project managers, dispatchers, etc.). For example, software application associated with condition monitoring system 140 may be configured to analyze an operating temperature associated with an engine system. Condition monitoring system 140 may compare current (e.g., real-time) engine temperature data with a historic engine temperature trend. If the current engine temperature data exceeds the historic trend data by a predetermined acceptable amount, condition monitoring system 140 may trigger an engine temperature alarm and/or generate an event notification for distribution to one or more subscribers 150.

Subscriber 150 may include a computer system that is configured to receive data from condition monitoring system 140 in a manner consistent with the disclosed embodiments. For example, subscriber 150 may include one or more computer terminals operated by respective users. Alternatively and/or additionally, subscriber 150 may include personal data assistant (PDA) systems, wireless communication devices (e.g., pagers, phones, etc.), notebook computers, diagnostic computer systems, data analyzers, or any other such computing devices configured to receive and process information, such as operation data. In one embodiment, subscriber 150 may be associated with one or more sections of a business entity associated with managing a remote project site within project environment 100. For instance, subscriber 150 may be associated with a particular division of a business entity associated with project environment 100, such as a project management division, an operations division, a maintenance and/or repair division, a procurement division, a human resource division, and/or any other business entity that may be associated with project environment 100.

Subscriber 150 may be associated with a business entity affiliated with project environment 100 and may be configured to communicate with condition monitoring system 140. In one embodiment, subscriber 150 may transmit and receive operation data to and from condition monitoring system 140 associated with one or more machines 110*a*, 110*b*. For example, subscriber 150 may be an on-site maintenance and repair division that receives alarm signals, fault condition signals, and/or sensor failure signals associated with one or more machines 110*a*, 110*b* from condition monitoring system 140. Accordingly, the maintenance and repair division may schedule maintenance for the machine to inspect the machine and resolve any problems that may have caused the alarm, fault, or failure condition. Condition monitoring system 140 may provide a message to an operator of the machine (via text message to a display device located on the control console of the machine) notifying the operator of the maintenance schedule. As a result, should condition monitoring system 140 determine that the operation data is consistent with a future failure event, subscriber 150 associated with a repair division may generate and provide an urgent request to the machine operator to bring the machine in for service, prior to the manifestation of the failure condition.

Subscriber 150 may also include portable communication devices associated with one or more personnel affiliated with project environment 100. For example, subscriber 150 may include a wireless pager or cell phone associated with a project manager, machine operator, dispatcher, repair technician, shift scheduler, or machine owner. As such, subscriber 150 may receive alarms and critical operational messages from condition monitoring system 140 associated with one or more machines operating within project environment 100. Accordingly, the features and systems described herein allow subscribers 150 to remotely monitor health, status, and productivity associated with one or more machines 110.

Processes and methods consistent with disclosed embodiments provide a system for detecting a data collection error associated with one or more on-board monitoring devices and resolving these data collection errors to avoid unnecessary shut-down of the machine. More specifically, the system described herein enables an electronic control module to identify a data collection error associated with a parameter to be collected by a data monitoring device, wirelessly communicate with an electronic control module associated with a nearby machine, receive a parameter compatible with the parameter associated with the data collection error, and substitute the parameter received from the nearby machine to temporarily maintain operation of the machine despite the data collection error. The systems and methods described herein may allow machines that would have otherwise shut-down in response to a data collection error caused by a faulty sensor to temporarily maintain operate until the faulty sensor can be repaired. Optionally, the presently disclosed system may provide a process for differentiating between data collection errors associated with monitoring devices that have become inaccurate or out-of-calibration and actual fault conditions. FIG. 3 provides a flowchart 300 depicting an exemplary method for maintaining machine operation despite a faulty monitoring device condition.

Figure 3A:
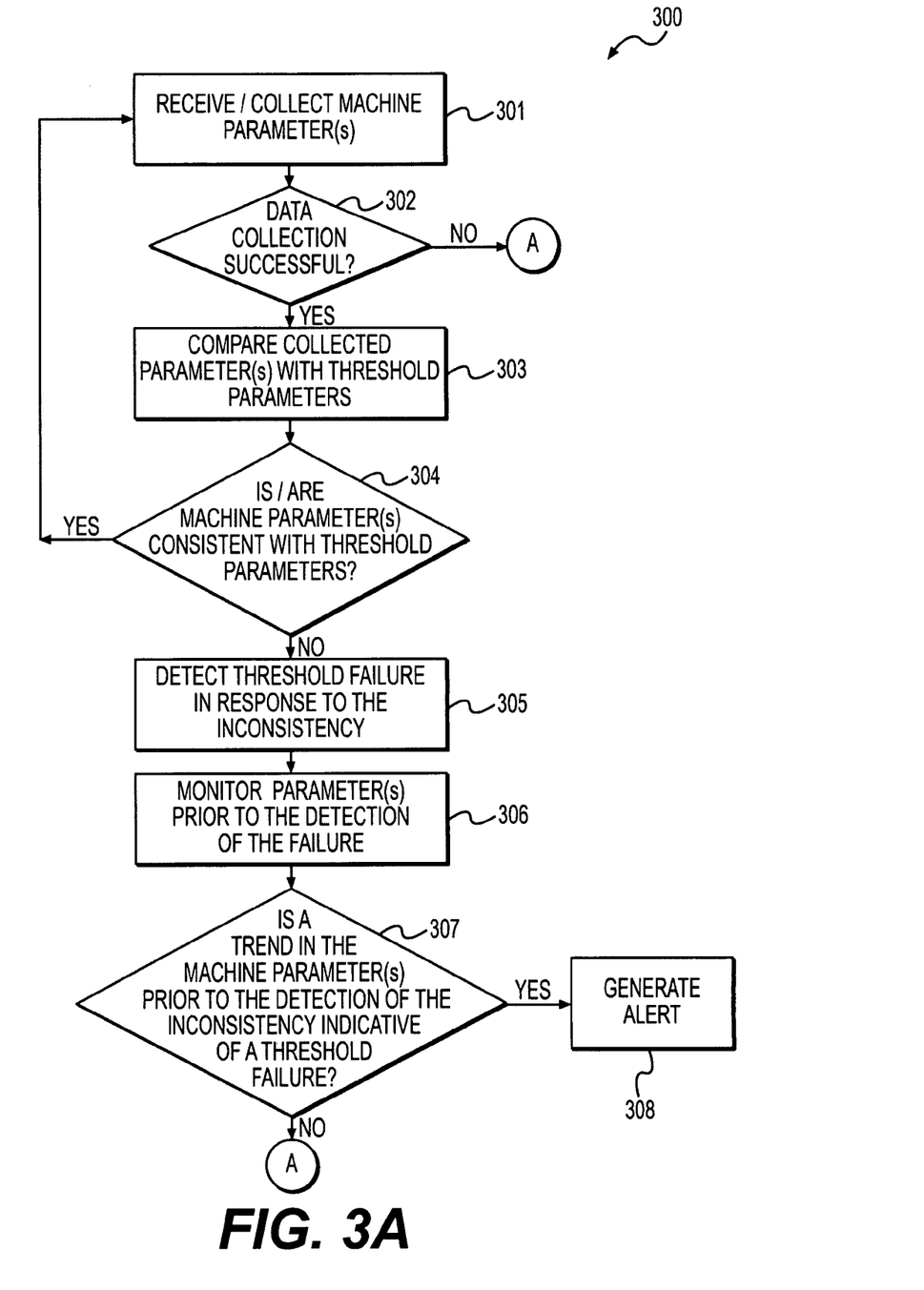
FIGS. 3A and 3B provide a flowchart depicting an exemplary method for temporarily resolving fault conditions in machine controllers.

As illustrated in FIG. 3A, the method may include receiving/collecting machine parameters (Step 301). For example, system 120 may include ECM 125a coupled to one or more monitoring devices 121a, 121b via communication lines 122. ECM 125a may receive machine operation parameters from each of the monitoring devices 121a, 121b. According to one embodiment, monitoring devices 121a, 121b may be configured to provide machine parameters to ECM 125a automatically (e.g., continuously or periodically during operation of machine 110a). Alternatively or additionally, monitoring devices 121a, 121b may be configured to provide machine parameters to ECM 125a in response to a query provided by the ECM 125a.

ECM 125a may determine whether data collection from each of monitoring devices 121a, 121b was successful (i.e., whether data was received from monitoring devices 121a, 121b in accordance with a respective data collection scheme) (Step 302). For example, ECM 125a may evaluate whether monitoring devices 121a, 121b provided data to ECM 125a according to a predetermined time period and, in the case of continuously-streamed data, whether the data stream was uninterrupted. Alternatively, ECM 125a may determine whether monitoring devices 121a, 121b provided proper and timely responses to a query provided to monitoring devices 121a, 121b.

If the data collection process was unsuccessful (Step 302: No), indicating a potential problem with the mechanics of the data collection system (e.g., a faulty timer, an unresponsive or faulty sensor, a disconnected or broken communication line 122, etc.), the method may proceed to sub-process "A" (Steps 309-313) of flowchart 300, which is directed toward resolving data collection errors. Following the example above, if the temperature sensor fails to provide a continuous temperature measurement to ECM 125a, ECM 125a may determine that the data collection process associated with the temperature sensor was not successful, and identify a data collection error associated with the temperature sensor. Sub-process "A" will be discussed in detail below.

If, on the other hand, the data collection process was successful (Step 302: Yes), ECM 125a may compare the collected parameter(s) with corresponding threshold parameters to determine if the machine is operating according to predetermined operational specifications (Step 303). Consequently, ECM 125a may determine whether the collected parameter(s) are consistent with the respective threshold parameter(s) (Step 304). If the measured parameter(s) are consistent with the threshold parameters (Step 304: Yes), indicating that that machine operation associated with the particular parameter is within specifications, the method may continue to step 301 to continue monitoring the machine parameters.

If, on the other hand, the measured parameters are not consistent with a respective threshold parameter (Step 304: No), ECM 125a may identify the parameter as being associated with a threshold failure (Step 305). In order to authenticate the inconsistency as an actual threshold fault and not, for example, an erroneous measurement due to a faulty, inaccurate, or un-calibrated monitoring device, ECM 125a may be configured to monitor stored parameters leading up to detection of the fault condition (Step 306), to determine whether a trend in the machine parameter leading up to the detection of the inconsistency was indicative of a future threshold failure event (Step 307). Those skilled in the art will recognize, for example, that detection of a temperature fault condition will likely be preceded by an increasing trend in the monitored temperature leading up to the fault condition. Similarly, no noticeable increase in the trend of temperature data leading up to a detected fault condition may be indicative of a fault in the temperature sensor itself.

Following the example above, if the temperature sensor provides the temperature measurement to ECM 125a, as expected, ECM 125a may evaluate the temperature data to ensure that the engine temperature is consistent with a predetermined threshold level indicative of normal engine temperature. If the engine temperature is consistent with the threshold, ECM 125a may continue to monitor the data parameters received from monitoring devices 121a, 121b. If, on the other hand, the engine temperature is inconsistent with the threshold, ECM 125a may compare the current temperature value with previously detect values immediately preceding the current value to determine if the current temperature value conforms to a trend associated with the previously detected values.

If a trend in the machine parameter data leading up to the detection of the inconsistency is indicative of a threshold failure condition (Step 307: Yes), indicating that the fault condition is legitimate, ECM 125a may generate an alert corresponding to the fault condition (Step 308). In contrast, if the trend in the machine parameter data leading up to the detection of the inconsistency is not indicative of a threshold failure condition (Step 307: No), indicating that the fault condition is likely a data collection error, ECM 125a may proceed to sub-process "A" (Step 309-313) of flowchart 200, directed toward resolving data collection errors.

From the example above, if the current engine temperature value is consistent with an increasing trend in engine temperature as determined through evaluation of the previously-detected engine temperature data, ECM 125a may determine that the detected fault condition was not a result of a faulty temperature sensor. However, if a trend in previously detected engine temperature data indicates that the engine was operating at a normal steady-state temperature level just prior to the detection of the fault condition and that the current engine temperature value represents a dramatic "peak" in temperature, ECM 125a may determine that the detection of the fault condition was a result of a fault or failure associated with temperature sensor corresponding with a data collection error.

Figure 3B:
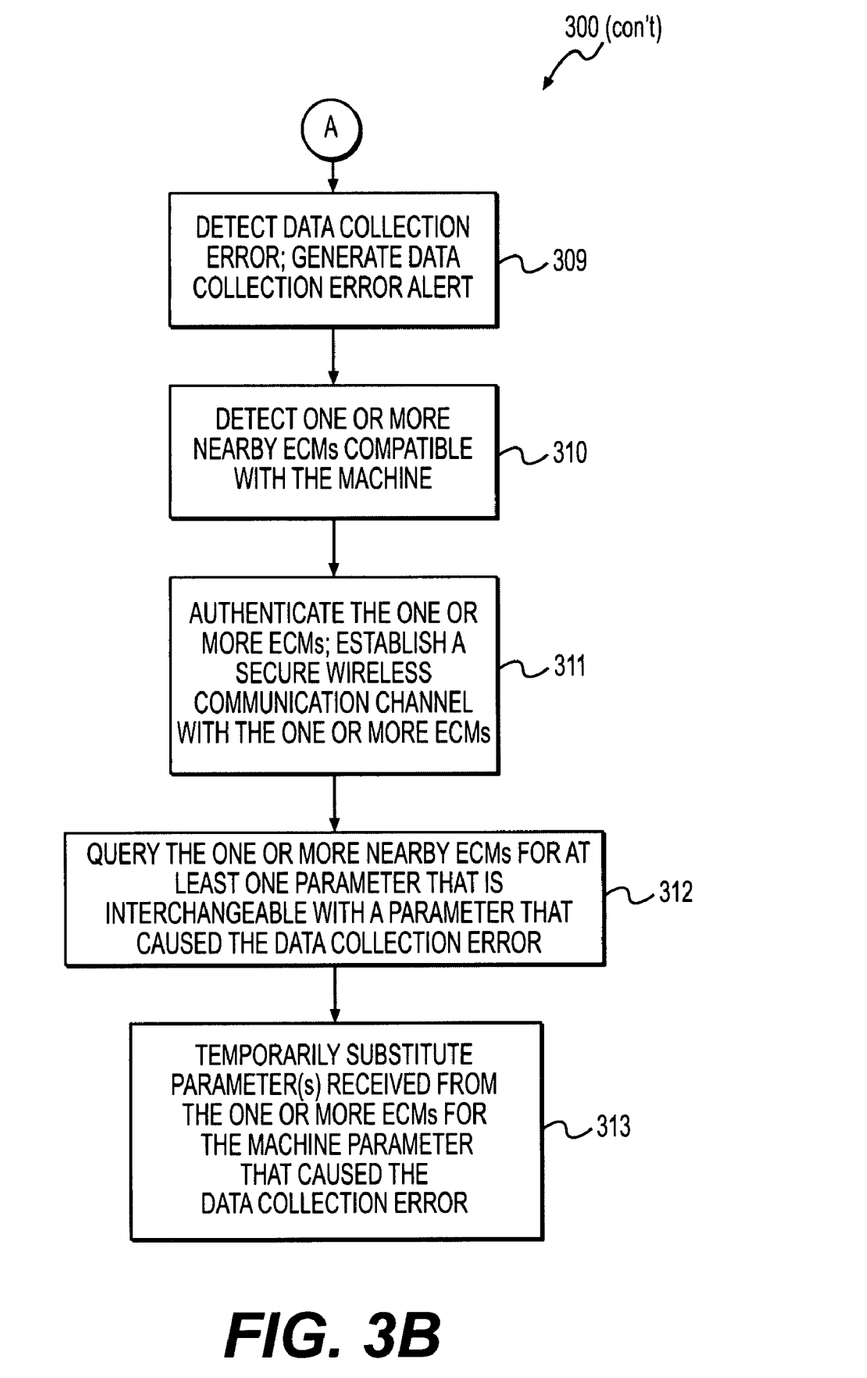

As illustrated in FIG. 3B, ECM 125a may detect a data collection error and generate a data collection error alert (Step 309). For example, ECM 125a may identify a data collection error based on either a failure to receive/collect parameters from one or more monitoring devices 121a, 121b (as in Step 302) or an erroneous measurement associated with one or more monitoring devices 121a, 121b (as in Step 307). Upon detection of the data collection error, ECM 125a may generate a data collection alert and provide the alert to subscribers 150 via condition monitoring system 140.

ECM 125a may be configured to detect one or more nearby ECMs associated with project environment 100, such as ECM 125b (Step 310). As explained, ECM 125a may include peer-to-peer or other short- to medium-range wireless communication equipment, and may be configured to detect one or more compatible ECMs (e.g., ECM 125b) associated with another machine operating within wireless range of machine 110a.

Once one or more compatible ECMs have been detected, ECM 125a may authenticate the one or more ECMs to determine whether ECM 125a has requisite authorization to communicate with the one or more other ECMs (Step 311). For example, a project manager associated with project environment 100 may designate other ECMs with which ECM 125a may communicate. ECMs may be designated such that only those ECMs located in a similar type of machine (e.g., same model number, same model family, etc.) and operating in a similar environment and under similar operating conditions, as ECM 125*a*. By designating the specific ECMs that are authorized to communicate with each other, a project manager may ensure that only those ECMs that are compatible with one another may exchange operation data, thereby avoiding the risk of potential harm to the machine that may result from substituting a parameter from an incompatible machine.

Once one or more compatible ECMs have been authenticated, ECM 125*a* may establish a secure wireless communication channel with one or more of the compatible ECMs. For example, ECM 125*a* may be equipped with IEEE 802.11*- compatible communication devices and may establish a secure, encrypted peer-to-peer wireless communication link between ECM 125*a* and one or more of the compatible ECMs. Alternatively, ECM 125*a* may be equipped with short-range (e.g., less than 100 m) Bluetooth communication device and may establish a secure communication link between ECM 125*a* and one or more Bluetooth compatible ECMs located on other machines.

Once a secure communication channel has been established, ECM 125*a* may be configured to query the one or more nearby ECMs for at least one parameter that is interchangeable with the parameter that caused the data collection error (Step 312). ECM 125*a* may temporarily substitute the at least one parameter for the parameter that caused the data collection error (Step 313). By substituting actual measured parameters received from one or more other machines, ECM 125*a* may be able to temporarily forego shut-down due to the data collection error until such time as the machine can be serviced to properly resolve the data collection error. According to one exemplary embodiment, in order to prevent prolonged operation of the machine using substitute data received from other machines, ECM 125*a* may be configured with a maximum time limit that the machine can operate with a data collection error condition present on the machine.

INDUSTRIAL APPLICABILITY

Systems and methods consistent with the disclosed embodiments provide a solution for detecting fault condition signals associated with a machine and analyzing the fault condition signals to ensure that the signals are not the result of data collection errors associated with data collection devices. If the fault condition signal is caused by a data collection error, an electronic control module associated with the machine may be configured to temporarily resolve the error by substituting data associated with a compatible electronic control module associated with a different machine operating nearby. As a result, project environments and work sites that employ the presently disclosed systems and associated methods may realize a significant reduction in machine downtime resulting from false detection of fault conditions resulting from data collection errors.

Although the disclosed embodiments are described and illustrated as being associated with data collection and distribution systems for electronic control modules associated with heavy machinery, they may be applicable to control modules associated with any type of mobile or stationary machine. Specifically, the presently disclosed systems and methods may be used in any machine or equipment system where it may be advantageous to differentiate between fault conditions and data collection errors associated with data collection devices and to temporarily resolve such errors without shutting down the machine. Furthermore, the presently disclosed systems and associated methods may be integrated with a connected worksite environment that monitors, analyzes, and manages operations of a plurality of machines to ensure efficient operation of the worksite.

The presently disclosed systems and methods for maintaining machine operation despite a data collection error may have several advantages. For example, the systems and methods described herein provide a process for differentiating between actual fault conditions and "false" fault conditions caused by a data collection error associated with a faulty sensor, without requiring the installation of backup sensors or redundant data collection devices. As a result, manufacturing and equipment costs may be significantly lower than conventional systems that attempt to resolve data collection errors through the use of extraneous backup equipment.

Moreover, the presently disclosed system may be configured to communication with and collect data from off-board sources (e.g., one or more nearby machines). Consequently, the presently disclosed system is not limited to on-board sources of substitution data in the event of a data collection error, as in some convention systems. As a result, should an on-board source for substitution data be unavailable of erroneous, the systems and methods described herein enable the electronic control module to search for data on machines operating nearby.

It will be apparent to those skilled in the art that various modifications and variations can be made to the disclosed system for maintaining machine operation despite a data collection error without departing from the scope of the disclosure. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A system for maintaining machine operation, comprising:
   at least one monitoring device coupled to a portion of a first machine operating in a machine environment, the at least one monitoring device configured to monitor a first parameter associated with the first machine; and
   a first electronic control module communicatively coupled to the at least one monitoring device and configured to:
   identify a data collection error associated with the at least one monitoring device;
   detect, in response to the data collection error, a second electronic control module proximate the first electronic control module, the second electronic control module configured to collect at least one second parameter that is interchangeable with the first parameter;
   establish a wireless communication channel with the second electronic control module; and
   download the at least one second parameter from the second electronic control module via the wireless communication channel.

2. The system of claim 1, wherein the first electronic control module is further configured to determine whether the second electronic control module is compatible with the first electronic control module.

3. The system of claim 1, wherein the first electronic control module is located on the first machine and the second electronic control module is located on a second machine.

4. The system of claim 3, wherein determining whether the second electronic control module is compatible with the first electronic control module includes:
   identifying a model number associated with the second machine; and
   determining, based on the identified model number, whether the second electronic control module is compatible with the first electronic control module.

5. The system of claim 1, wherein the first electronic control module is further configured to substitute the at least one second parameter for the first parameter associated with the data collection error.

6. The system of claim 5, wherein the first electronic control module is further configured to generate a warning signal indicative of the data collection error.

7. The system of claim 1, wherein the wireless communication channel includes a peer-to-peer wireless communication channel and the first and second electronic control modules are adapted to communicate via the peer-to-peer wireless communication channel.

8. The system of claim 1, wherein the wireless communication channel includes a Bluetooth-compatible wireless communication channel and the first and second electronic control modules are adapted to communicate via the Bluetooth-compatible wireless communication channel.

9. A method for maintaining machine operation, comprising:
   identifying a data collection error associated with a first parameter to be collected by a first electronic control module of a first machine;
   detecting, in response to the data collection error, a second electronic control module proximate the first electronic control module, the second electronic control module configured to collect at least one second parameter that is interchangeable with the first parameter;
   establishing, by the first electronic control module, a wireless communication channel between the first electronic control module and the second electronic control module;
   querying the second electronic control module for the at least one second parameter; and
   receiving the at least one second parameter from the second electronic control module via the wireless communication channel, in response to the query.

10. The method of claim 9, wherein the second electronic control module is associated with a second machine.

11. The method of claim 10, wherein detecting the second electronic control module includes determining whether the second electronic control module is compatible with the first electronic control module.

12. The method of claim 11, wherein determining whether the second electronic control module is compatible with the first electronic control module includes:
   identifying a model number associated with the second machine; and
   determining, based on the identified model number, whether the second electronic control module is compatible with the first electronic control module.

13. The method of claim 9, wherein receiving the at least one parameter from the second electronic control module includes substituting the at least one parameter for the parameter associated with the data collection error.

14. The method of claim 13, further including generating a warning signal indicative of the data collection error.

15. The method of claim 9, wherein the wireless communication channel includes a peer-to-peer wireless communication channel and the first and second electronic control modules are adapted to communicate via the peer-to-peer wireless communication channel.

16. The method of claim 9, wherein the wireless communication channel includes a Bluetooth-compatible wireless communication channel and the first and second electronic control modules are adapted to communicate via the Bluetooth-compatible wireless communication channel.

17. A project environment, comprising:
   a first machine operating in the project environment, the first machine being proximate a second machine;
   at least one monitoring device coupled to a portion of the first machine, the at least one monitoring device configured to monitor a first parameter associated with the first machine; and
   a first electronic control module disposed on the first machine and communicatively coupled to the at least one monitoring device, the first electronic control module configured to:
      identify a data collection error associated with the at least one monitoring device;
      detect, in response to the data collection error, a second electronic control module associated with the second machine, the second electronic control module configured to collect at least one second parameter that is interchangeable with the first parameter;
      establish a wireless communication channel with the second electronic control module; and
      download the at least one second parameter from the second electronic control module via the wireless communication channel.

18. The project environment of claim 17, wherein the first electronic control module is further configured to determine whether the second electronic control module is compatible with the first electronic control module.

19. The project environment of claim 18, wherein determining whether the second electronic control module is compatible with the first electronic control module includes:
   identifying a model number associated with the second machine; and
   determining, based on the identified model number, whether the second electronic control module is compatible with the first electronic control module.

20. The project environment of claim 17, wherein the first electronic control module is further configured to substitute the at least one second parameter for the first parameter associated with the data collection error.

21. The project environment of claim 17, wherein the first electronic control module is further configured to generate a warning signal indicative of the data collection error.

* * * * *